United States Patent
Pianigiani et al.

(10) Patent No.: US 11,997,011 B2
(45) Date of Patent: May 28, 2024

(54) VIRTUAL PORT GROUP

(71) Applicant: Juniper Networks, Inc., Sunnyvale, CA (US)

(72) Inventors: Jacopo Pianigiani, Cupertino, CA (US); Tong Jiang, Fremont, CA (US); Sukhdev S. Kapur, Saratoga, CA (US); Atul S Moghe, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/588,749

(22) Filed: Sep. 30, 2019

(65) Prior Publication Data
US 2020/0344158 A1 Oct. 29, 2020

Related U.S. Application Data

(60) Provisional application No. 62/839,591, filed on Apr. 26, 2019.

(51) Int. Cl.
*H04L 45/00* (2022.01)
*H04L 12/46* (2006.01)
(Continued)

(52) U.S. Cl.
CPC .......... *H04L 45/46* (2013.01); *H04L 12/4641* (2013.01); *H04L 45/42* (2013.01);
(Continued)

(58) Field of Classification Search
CPC ....... H04L 45/46; H04L 45/42; H04L 45/586; H04L 45/64; H04L 41/0893; H04L 41/08;
(Continued)

(56) References Cited

U.S. PATENT DOCUMENTS 10,200,274 B1* 2/2019 Suryanarayana ....... H04L 45/02
10,291,497 B2    5/2019 Mehta et al.
(Continued)

FOREIGN PATENT DOCUMENTS

WO    2013184846 A1    12/2013

OTHER PUBLICATIONS

Brandon Lee, "ESXi Network Concepts\ WMware Adminstration Essentials", Dec. 6, 2016, pp. 3, 4. (Year: 2016).*
(Continued)

*Primary Examiner* — Kibrom T Hailu
*Assistant Examiner* — Robert Ma
(74) *Attorney, Agent, or Firm* — Shumaker & Sieffert, P.A.

(57) ABSTRACT

A virtual port group abstraction can facilitate automated configuration of devices in a data center. For example, a data center administrator can define a virtual port group to include a set of logical and physical interfaces for devices allocated to a particular department or other group within a company. An administrator for the department can then utilize a user interface to perform actions with respect to the virtual port group. The actions can include configuration actions, modeling actions and/or deployment actions. An action received by a network management controller such as a Software-Defined Networking (SDN) controller can be converted into the appropriate actions for the relevant logical and physical interfaces that are configured to be part of the virtual port group.

20 Claims, 8 Drawing Sheets

(51) Int. Cl.
*H04L 45/42* (2022.01)
*H04L 45/586* (2022.01)
*H04L 45/64* (2022.01)
*H04L 49/00* (2022.01)
*H04L 49/354* (2022.01)

(52) U.S. Cl.
CPC ............ *H04L 45/586* (2013.01); *H04L 45/64* (2013.01); *H04L 49/354* (2013.01); *H04L 49/70* (2013.01)

(58) Field of Classification Search
CPC ... H04L 49/354; H04L 49/70; H04L 41/0895; H04L 41/122
See application file for complete search history.

(56) References Cited

U.S. PATENT DOCUMENTS

| | | |
|---|---|---|
| 11,108,629 B1 | 8/2021 | Cahyadi et al. |
| 2006/0187853 A1* | 8/2006 | Mititelu ............ H04L 12/5601 370/254 |
| 2006/0230185 A1 | 10/2006 | Errickson et al. |
| 2011/0299534 A1 | 12/2011 | Koganti et al. |
| 2012/0207177 A1* | 8/2012 | Sharma ................. H04L 43/00 370/419 |
| 2014/0201642 A1* | 7/2014 | Vicat-Blanc ......... H04L 41/122 715/736 |
| 2016/0012008 A1* | 1/2016 | Akiyoshi ............... H04L 49/30 709/213 |
| 2016/0173329 A1* | 6/2016 | Latham ............. H04L 41/0895 370/254 |
| 2016/0308790 A1 | 10/2016 | Jiang et al. |

OTHER PUBLICATIONS

SDxCentral Studios, "What is an OpenFlow Controller?", Jun. 23, 2016. (Year: 2016).*
Hopps, "Analysis of an Equal-Cost Multi-Path Algorithm," RFC 2992, Network Working Group, Nov. 2000, 8 pp.
Extended Search Report from counterpart European Application No. 19218533.8, dated Jul. 16, 2020, 10 pp.
"vSphere Basic System Administration," VMware, Inc., vCenter Server 4.0. ESX 4.0. ESXi 4.0. vol. EN-000105-01, Jun. 2009, 374 pp.
"Improving the usability of network virtualization and management in a clustered switch architecture with IEEE 802.1Qbg technology," IP.com Prior Art Database Technical Disclosure, Mar. 28, 2014, 5 pp.
Response to Extended Search Report dated Jul. 16, 2020 from counterpart European Application No. 19218533.8, filed Apr. 28, 2021, 21 pp.
Notice of Intent to Grant and Text Intended to Grant from counterpart European Application No. 19218533.8 dated Jun. 1, 2022, 37 pp.
First Office Action and Search Report, and translation thereof, from counterpart Chinese Application No. 201911330209.3 dated Nov. 2, 2022, 13 pp.
Ip.com, "Improving the usability of network virtualization and management in a clustered switch architecture with IEEE 802.1 Qbg technology", Mar. 2014, 5 pp.
Vmware, "vSphere Basic System Administration", vCenter Server 4.0, ESX 4.0, ESXi 4.0, Dec. 2011, 364 pp.
Notice of Intent to Grant and Text Intended to Grant from counterpart European Application No. 19218533.8 dated Nov. 15, 2022, 38 pp.
Second Office Action, and translation thereof, from counterpart Chinese Application No. 201911330209.3 dated May 30, 2023, 6 pp.

* cited by examiner

OVERLAY ▲ VIRTUAL PORT GROUP ▲ CREATE VIRTUAL PORT GROUP

VIRTUAL NETWORKS
VIRTUAL PORT GROUP
NETWORK POLICIES
MULTICAST POLICIES
LOGICAL ROUTERS
SECURITY GROUPS
FLOATING IPs
IPAM
ROUTING
PORTS
DCI

VIRTUAL PORT GROUP NAME*
HR_DEPARTMENT

VLAN

| VLAN ID | DISPLAY NAME* | NETWORK* |
| 100 | HR_VLAN_100 | ABC_CO_NET |

| VLAN ID | | |
| 110 | VLAN_11HR_110 | ABC_CO_NET |

+ADD

FABRIC NAME*
BR-FB-1

CREATE     CANCEL

640

| | |
|---|---|
| VIRTUAL NETWORKS | OVERLAY ▲ VIRTUAL PORT GROUP ▲ CREATE VIRTUAL PORT GROUP |
| VIRTUAL PORT GROUP | VIRTUAL PORT GROUP NAME* |
| NETWORK POLICIES | HR_DEPARTMENT |
| MULTICAST POLICIES | VLAN |
| LOGICAL ROUTERS | |
| SECURITY GROUPS | |
| FLOATING IPs | |
| IPAM | |
| ROUTING | |
| PORTS | |
| DCI | |

VLAN ID: 100  DISPLAY NAME*: HR_VLAN_100  NETWORK*: ABC_CO_NET

VLAN ID: 110  VLAN_11HR_110  ABC_CO_NET

+ADD

FABRIC NAME*: BR-FB-1

AVAILABLE PHYSICAL INTERFACE — 642

| DISPLAY NAME | PHYSICAL ROUTER |
|---|---|
| XE-0/0/37 | WS3718230053 |
| XE-0/0/43 | WS3718230053 |
| GE-0/0/45 | WS3718230306 |

ASSIGNED PHYSICAL INTERFACE — 644

| DISPLAY NAME | PHYSICAL ROUTER |
|---|---|
| XE-0/0/0 | WS3718230396 |
| ET-0/0/51 | WS3718230053 |
| GE-0/0/42 | WS3718230053 |

CREATE  CANCEL

FIG. 6B

VIRTUAL PORT GROUP

This application claims the priority benefit of U.S. Provisional Patent Application Ser. No. 62/839,591, filed Apr. 26, 2019, the entire contents of which is incorporated herein by reference.

TECHNICAL FIELD

The disclosure relates to computer networks and, more particularly, to configuring network devices and servers.

BACKGROUND

In a typical cloud data center environment, a large collection of interconnected servers provides computing (e.g., compute nodes) and/or storage capacity to run various applications. For example, a data center comprises a facility that hosts applications and services for customers of the data center. The data center, for example, hosts all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Software Defined Networking (SDN) platforms may be used in data centers, and in some cases, may use a logically centralized and physically distributed SDN controller, and a distributed forwarding plane in virtual routers that extend the network from an underlay network comprising physical routers and switches in the data center into a virtual overlay network hosted in virtualized servers. The SDN controller provides management, control, and analytics functions of a virtualized network and orchestrates the virtual routers by communicating with the virtual routers.

SUMMARY

In general, the disclosure describes techniques for using a model of the physical and logical interfaces that connect an endpoint to one or more devices. In some aspects, a single abstraction data model, referred to as a virtual port group, models the physical and/or logical interfaces to connect an endpoint to one or more devices. The virtual port group can include physical and/or logical interfaces, and the interfaces can be single or multi-homed to a single device or multiple devices. Various aspects of the virtual port group can enable the modeling of infrastructure deployment constructs as well as networking services running on top of the infrastructure constructs. For example, in some aspects, the virtual port group can facilitate a generic abstraction that can be used to consistently model attachment points (e.g., bridge domains, Virtual Local Area Networks (VLANs), Virtual Private Networks (VPNs), other virtual networks, and other service attachment points) that are supported by an underlying physical infrastructure connectivity model. The underlying physical infrastructure may be a single homed server to a single device, a multi-interface homed server to a single device, a multi-interface/multi-device homed server, a single interface, a multi-device homed server, etc. Further, the virtual port group can facilitate modelling an endpoint networking service on top of the physical connectivity models described by the virtual port group. As a result, service connectivity may be executed and modeled across different physical infrastructure connectivity models.

The virtual port group abstraction can facilitate automated configuration of devices in a data center. For example, a data center administrator can define a virtual port group to include a set of logical and physical interfaces for devices allocated to a particular department or other group within a company. An administrator for the department can then utilize a user interface to perform actions with respect to the virtual port group. The actions can include configuration actions, modeling actions and/or deployment actions. An action received by a network management controller such as an SDN controller and to be performed on a virtual port group can be converted by the SDN controller into the appropriate actions for the relevant logical and physical interfaces that are configured to be part of the virtual port group.

In one example aspect, a method includes storing, in a configuration database, a virtual port group object for a virtual port group, the virtual port group identified by a virtual port group name, the virtual port group comprising one or more references to interface objects representing logical and physical interfaces in a network controlled in part by a Software-Defined Networking (SDN) controller; receiving, by an SDN controller for the network, an indication of an interface action to be performed on an interface identified by an interface identifier, wherein the interface identifier comprises the virtual port group name of the virtual port group; in response to determining that the interface identifier comprises the virtual port group name, determining, by the SDN controller, a set of one or more of the logical and physical interfaces referenced by the virtual port group object that are affected by the interface action; and performing, by the SDN controller, the interface action with respect to the set of the one or more logical and physical interfaces.

In another example aspect, an SDN controller includes one or more processors coupled to a memory, the memory including executable instructions to cause the one or more processors to: store, in a configuration database, a virtual port group object for a virtual port group, the virtual port group identified by a virtual port group name, the virtual port group comprising one or more references to interface objects representing logical and physical interfaces in a network controlled in part by the SDN controller; receive an indication of an interface action to be performed on an interface identified by an interface identifier, wherein the interface identifier comprises the virtual port group name of the virtual port group; in response to a determination that the interface identifier comprises the virtual port group name, determine a set of one or more of the logical and physical interfaces referenced by the virtual port group object that are affected by the interface action; and perform the interface action with respect to the set of the one or more logical and physical interfaces.

In a further example aspect, a computer-readable medium includes instructions for causing one or more programmable processors executing a network management controller to: store, in a configuration database, a virtual port group object for a virtual port group, the virtual port group identified by a virtual port group name, the virtual port group comprising one or more references to interface objects representing logical and physical interfaces in a network controlled in part by the SDN controller; receive an indication of an interface action to be performed on an interface identified by an interface identifier, wherein the interface identifier comprises the virtual port group name of the virtual port group;

in response to a determination that the interface identifier comprises the virtual port group name, determine a set of one or more of the logical and physical interfaces referenced by the virtual port group object that are affected by the interface action; and perform the interface action with respect to the set of the one or more logical and physical interfaces.

The techniques of this disclosure may provide one or more advantages. For example, the techniques may enable an administrator responsible for a subset of systems in a data center (e.g., systems associated with a particular group, department, etc. of a company) to manage attachment points for the subset of systems without needing to know the configuration of the physical infrastructure supporting the attachment points. The techniques can significantly reduce the complexity and time required for the administrator to configure attachments points, thereby reducing errors in configuration and allowing for scalable configuration of large data centers having many network devices.

The details of one or more examples are set forth in the accompanying drawings and the description below. Other features, objects, and advantages will be apparent from the description and drawings, and from the claims.

DETAILED DESCRIPTION

Figure 1:
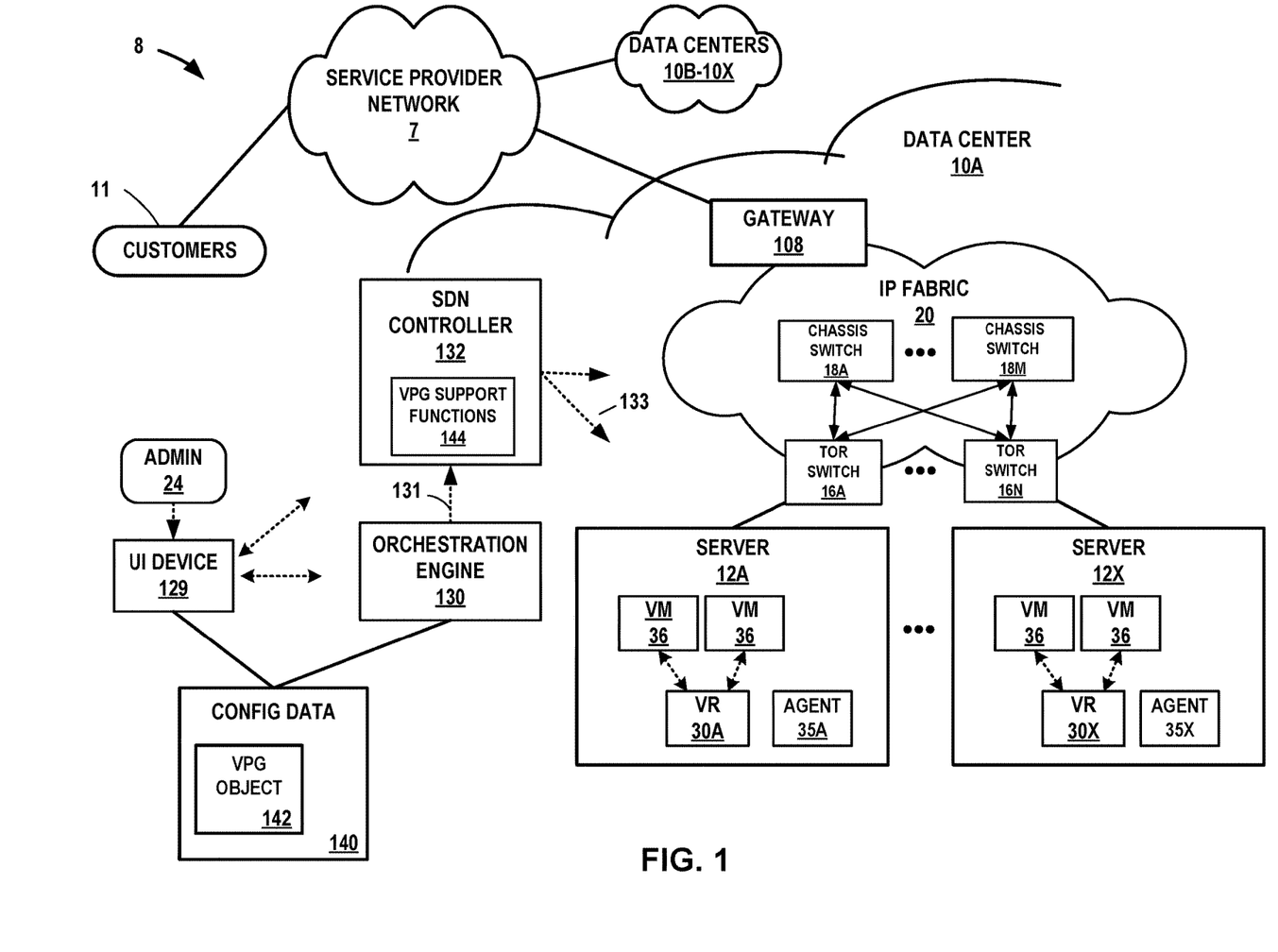
FIG. 1 is a block diagram illustrating an example computer network system in accordance with techniques described herein.

FIG. 1 is a block diagram illustrating an example computer network system 8 in accordance with techniques described herein. Computer network system 8 in the example of FIG. 1 includes data centers 10A-10X (collectively, "data centers 10") interconnected with one another and with customer networks associated with customers 11 via a service provider network 7. FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for customers 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers, and may thus form part of a large-scale public network infrastructure, e.g., the Internet. In some examples, data center 10A may represent one of many geographically distributed network data centers. As illustrated in the example of FIG. 1, data center 10A is a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific, or super-computing, and so on. In some examples, data center 10A is an individual network server, a network peer, or otherwise.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more application workloads. As described herein, the terms "application workloads" or "workloads" may be used interchangeably to refer to application workloads. Workloads may execute on a virtualized environment, such as a virtual machine 36, a container, or some of type of virtualized instance, or in some cases on a bare metal server that executes the workloads directly rather than indirectly in a virtualized environment. Each of servers 12 may be alternatively referred to as a host computing device or, more simply, as a host. A server 12 may execute one or more workloads on one or more virtualized instances, such as virtual machines 36, containers, or other virtual execution environment for running one or more services (such as virtualized network functions (VNFs)). Some or all of the servers 12 can be bare metal servers (BMS). A BMS can be a physical server that is dedicated to a specific customer or tenant.

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected top-of-rack (TOR) switches 16A-16N (collectively, "TOR switches 16") coupled to the distribution layer of chassis switches 18A-18M (collectively, "chassis switches 18"). In some examples, chassis switches 18 may operate as spine nodes and TOR switches 16 may operate as leaf nodes in data center 10A. Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7. Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and customers 11 by service provider network 7.

Switch fabric 20 may perform layer 3 routing to route network traffic between data center 10A and customers 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via a northbound API 131, which in turn operates in response to configuration input received from an administrator 24 operating user interface device 129. In some aspects, the SDN controller 132 may be part of a high availability (HA) cluster and provide HA cluster configuration services. Additional information regarding SDN controller 132 operating in conjunction with other devices of data center 10A or other networks is found in International Application Number PCT/US2013/044378, filed Jun. 5, 2013, and entitled "PHYSICAL PATH DETERMINATION FOR VIRTUAL NETWORK PACKET FLOWS," and in U.S. patent application Ser. No. 15/476,136, filed Mar. 31, 2017 and entitled, "SESSION-BASED TRAFFIC STATISTICS LOGGING FOR VIRTUAL ROUTERS," wherein both applications are incorporated by reference in their entirety as if fully set forth herein.

For example, SDN platforms may be used in data center 10 to control and manage network behavior. In some cases, an SDN platform includes a logically centralized and physically distributed SDN controller, such as SDN controller 132, and a distributed forwarding plane in the form of virtual routers that extend the network from physical routers and switches in the data center switch fabric into a virtual overlay network hosted in virtualized servers.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. One such communication protocol may include a messaging communications protocol such as XMPP, for example. Other southbound protocols may include Netconf, OpenFlow, P4, etc. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a virtualized environment. SDN controller 132 maintains routing, networking, and configuration information within a state database. SDN controller 132 communicates a suitable subset of the routing information and configuration information from the state database to virtual router (VR) 30A-30X or agents 35A-35X ("AGENT" in FIG. 1) on each of servers 12A-12X.

As described herein, each of servers 12 include a respective forwarding component that performs data forwarding and traffic statistics collection functions for workloads executing on each server 12. In the example of FIG. 1, each forwarding component is described as including a virtual router ("VR 30A—VR 30X" in FIG. 1) to perform packet routing and overlay functions, and a VR agent ("VA 35A-35X" in FIG. 1) to communicate with SDN controller 132 and, in response, configure the virtual routers 30.

In this example, each virtual router 30A-30X implements at least one routing instance for corresponding virtual networks within data center 10 and routes the packets to appropriate virtual machines, containers, or other elements executing within the operating environment provided by the servers. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In the example of FIG. 1, SDN controller 132 learns and distributes routing and other information (such as configuration) to all compute nodes in the data center 10. The VR agent 35 of a forwarding component 39 running inside the compute node, upon receiving the routing information from SDN controller 132, typically programs the data forwarding element (virtual router 30) with the forwarding information. SDN controller 132 sends routing and configuration information to the VR agent 35 using a messaging communications protocol such as XMPP protocol semantics rather than using a more heavy-weight protocol such as a routing protocol like BGP. In XMPP, SDN controller 132 and agents communicate routes and configuration over the same channel. SDN controller 132 acts as a messaging communications protocol client when receiving routes from a VR agent 35, and the VR agent 35 acts as a messaging communications protocol server in that case. Conversely, SDN controller 132 acts as a messaging communications protocol server to the VR agent 35 as the messaging communications protocol client when the SDN controller sends routes to the VR agent 35. SDN controller 132 may send security policies to VR agents 35 for application by virtual routers 30.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 10A such as compute, storage, networking, and application resources. For example, orchestration engine 130 may create a virtual network for a tenant within data center 10A or across data centers. Orchestration engine 130 may attach workloads (WLs) to a tenant's virtual network. Orchestration engine 130 may connect a tenant's virtual network to an external network, e.g. the Internet or a VPN. Orchestration engine 130 may implement a security policy across a group of workloads or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 20 or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular traffic flow over a single deterministic path.

Virtual routers (virtual router 30A to virtual router 30X, collectively "virtual routers 30" in FIG. 1) execute multiple routing instances for corresponding virtual networks within data center 10A and routes the packets to appropriate workload executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

As noted above, an administrator 24 may operate user interface device 129 to configure attributes of the devices and services provided in data center 10A. An administrator 24 can utilize user interface device 129 to create a virtual port group object 142. In some aspects, a virtual port group object 142 can include a set of physical and/or logical interfaces of the devices and services in an SDN, and can model the connectivity between devices and services within the SDN that utilize the physical and/or logical connections. As an example, a virtual port group object 142 can include references to one or more physical interfaces. A physical interface may in turn refer to a physical device such as a router or switch that incorporates the physical interface. Additionally, a virtual port group object may include zero or more logical interfaces. A logical interface can refer to a Virtual Service Interface (VSI) or a Virtual Machine Interface (VMI), for instance. A VSI or VMI can refer to an actual service model. While referred to herein as a VMI, a VMI may represent another type of logical interface for connecting a virtual execution element to a virtual router, such as a veth interface. In addition, a VMI may connect other types of virtual execution elements to the virtual router besides virtual machines, such as containers. The service models can range in complexity. Examples of a service model include, but are not limited to, a VPN, a VLAN, a Managed Extensibility Framework (MEF), a Pseudo Wire Emulation (PWE), etc. Additionally, a virtual port group object may maintain mappings from logical interfaces to the physical interfaces that support the logical interfaces. A mapping may be a one-to-one mapping or a one-to-many mapping. For example, a virtual port group that includes a multi-homed server may have a one-to-many mapping between a logical interface for the server and the multiple physical interfaces that a used by the logical interface to communicate with other devices. A reference to an interface in a VPG may be a text string, a pointer to a data construct for an interface, or other indicator of the interface.

SDN controller 132 can include virtual port group support functions 144. The virtual port group support functions 144 provide software, firmware, or other logic that supports interactions and actions associated with virtual port group objects 142. Examples of such actions are discussed in further detail below.

Networking services may be modeled generically as service attachment points (logical interfaces) on top of single or multi-homed interfaces across one or more devices. For example, in a data center deployment, the endpoint may be a server. The server may have one or more network interface cards. A server may be connected to one or more devices via the one or more network interface cards. A server may be connected with one or more physical interfaces to the same single device, or one or more interfaces to more than one device. Also, a server may have one or more logical interfaces on top of these multiple, potentially multi-homed, interfaces to devices. With a single abstraction, the techniques disclosed herein may enable the modeling of multiple possible infrastructure deployments as well as the networking services running on top of those infrastructure constructs. Networking services may be modeled generically as service attachment points (e.g., "logical interfaces") on top of single or multi-homed interfaces across one or more devices.

The functionality for the elements of computer network system 8 described above may be distributed differently that described above. In some aspects, functionality described herein as being performed by an element may be performed by another element or divided between multiple elements. Functionality described for one or more elements may be integrated with another element. For example, although illustrated as separate entities in FIG. 1, in some aspects, the SDN controller 132 and the orchestration engine 130 may be implemented as a single entity. For instance, some or all of the functionality of the orchestration engine 130 may be integrated with the SDN controller 132.

This disclosure describes creating and using a virtual port group object that can, in some aspects, model an abstraction of the physical connectivity between an endpoint to one or more devices. Additionally, the same virtual port group abstraction can model the logical connectivity of networking services on top of the physical connectivity. A practical application of the techniques described in further detail below is that an administrator for a subset of systems in a data center (e.g., accounting systems, human resource systems etc.) can configure connectivity for the systems and services based on virtual port groups that define attachment points. The administrator does not need to configure the underlying physical infrastructure that supports the logical attachment points. The system can automatically provide configuration data and commands to configure the underlying physical infrastructure associated with the attachment points that are configured by the administrator. The reduction of configuration complexity and configuration error is an advantage that some examples can provide over previous configuration methodology, and may avoid errors and increase network scalability.

Figure 2:
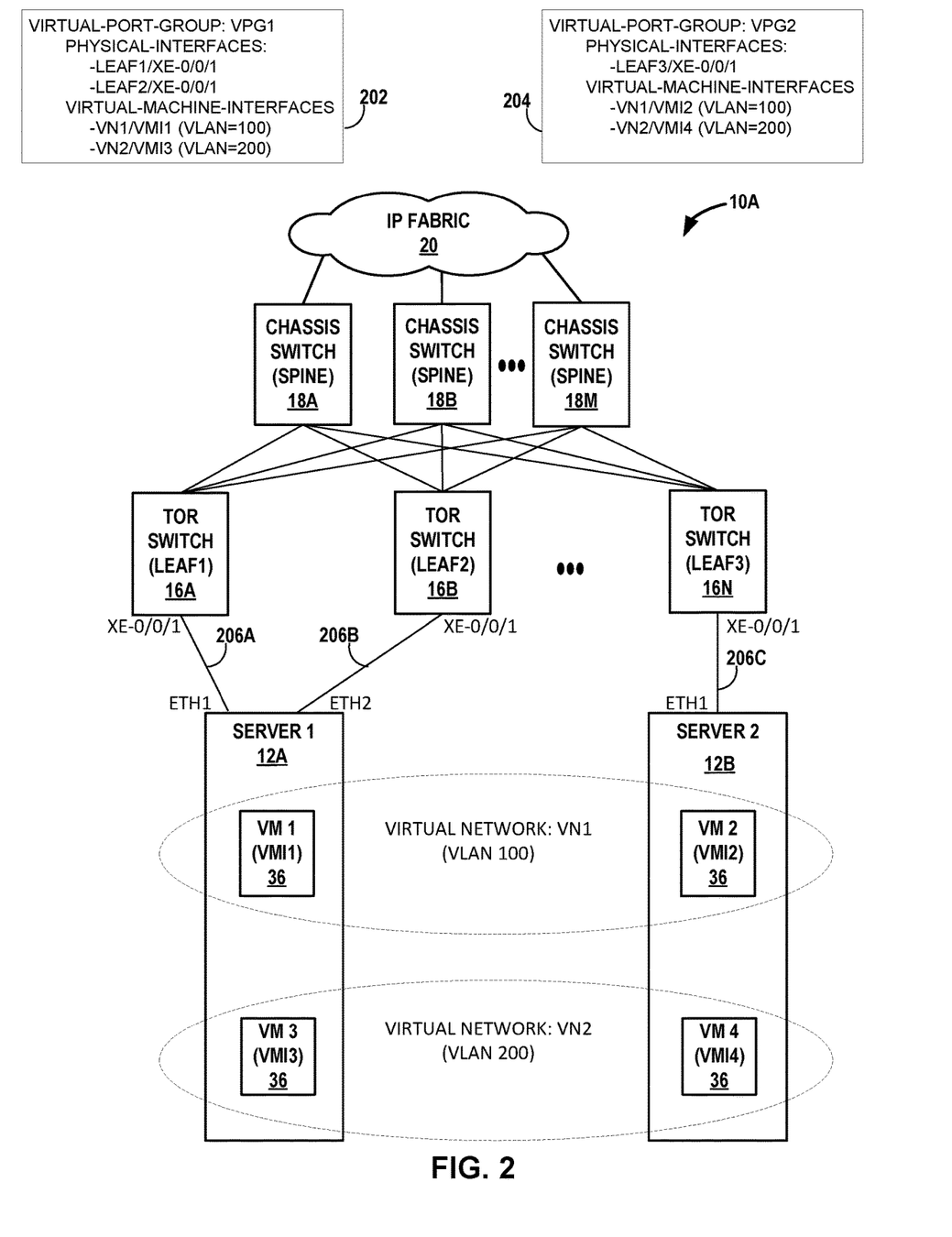
FIG. 2 is a block diagram illustrating a server-centric view of connectivity toward devices of a virtual port group in accordance with techniques described herein.

FIG. 2 is a block diagram illustrating a server-centric view of connectivity toward devices of a virtual port group in an example configuration. In the example illustrated in FIG. 2, two virtual port groups are modeled, VPG1 and VPG2. VPG1 has a configuration 202 and VPG2 has a configuration 204. Virtual port group objects for VPG1 and VPG2 can be created based on configurations 202 and 204. From the point of view of server 1 12A, VPG1 defines connections between logical interfaces VMI1 and VMI3, and two physical interfaces, e.g., connections 206A to port XE-0/0/1 of TOR switch 16A, and 206B to port XE-0/0/1 of TOR switch 16B. From the point of view of server 2 12B, VPG2 defines a connection 206C between logical interfaces VMI2 and VMI4, and a single physical interface, port XE-0/0/1 of TOR switch 16N.

Figure 3:
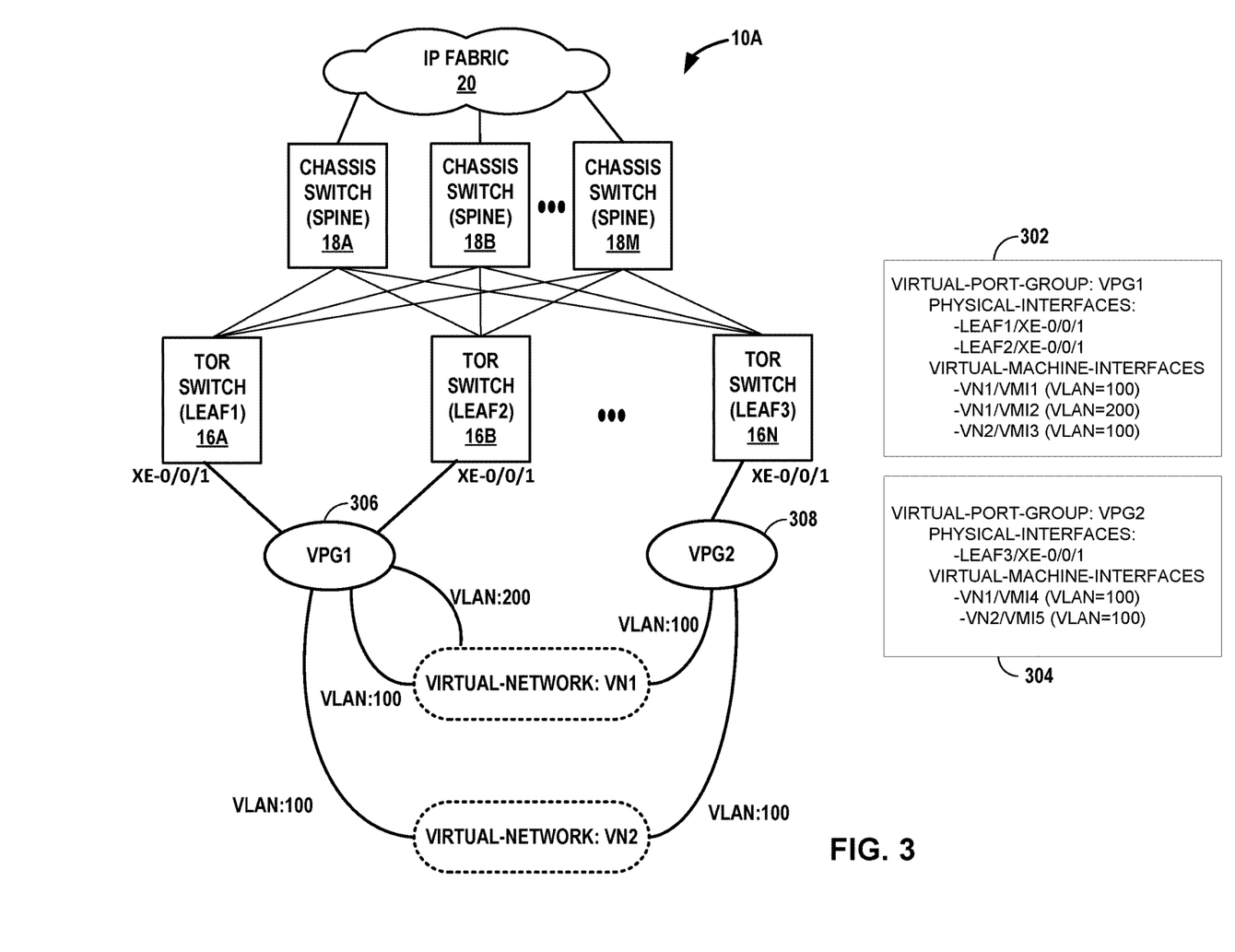
FIG. 3 is a block diagram illustrating a device-centric view of physical/logical connectivity of endpoints to devices with a virtual port group in accordance with techniques described herein.

FIG. 3 is a block diagram illustrating a device-centric view of physical/logical connectivity of endpoints to devices with a virtual port group in an example configuration. In the example illustrated in FIG. 3, two virtual port groups are modeled, VPG1 and VPG2. VPG1 has a configuration 302 and VPG2 has a configuration 304. Virtual port group objects 306 and 308 for VPG1 and VPG2 can be created based on configurations 302 and 304.

Figure 4A:
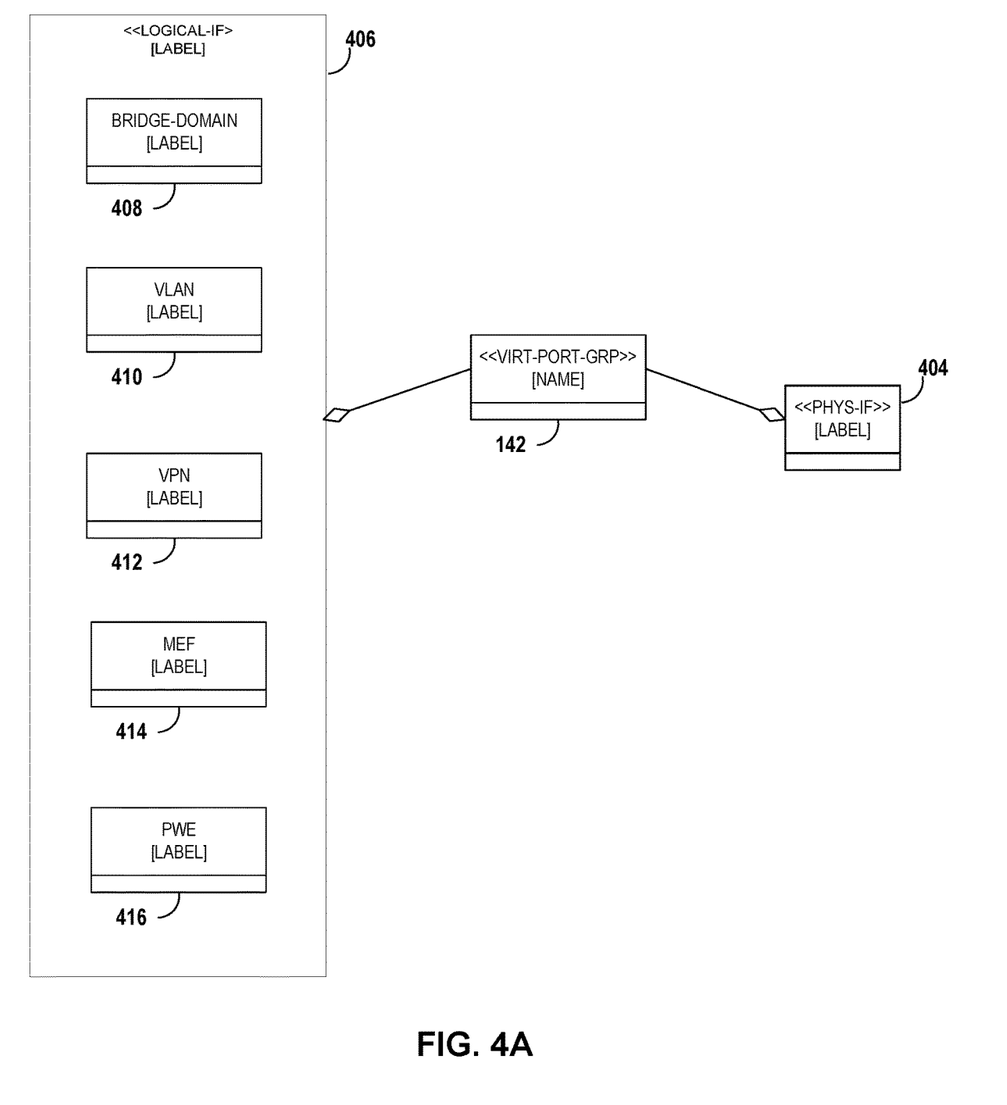
FIG. 4A is a block diagram illustrating a data model for a virtual port group in accordance with techniques described herein.

FIG. 4A is a block diagram illustrating a data model including a virtual port group in accordance with techniques described herein. In some aspects, a virtual port group object 142 includes a name (e.g., an identifier or label) that uniquely identifies the virtual port group within a data center. In some aspects, the name may be assigned by a network or data center administrator. Once assigned, the name can be used in user interfaces in fields that accept a port or port group as input.

A virtual port group object 142 can include one or more links or references to physical interface objects 404. A physical interface object 404 includes data that describes a physical link that connects a device such as a server to a port on a switch (e.g., a TOR switch). Further, a virtual port group object 142 can include one or more links or references to logical interface objects 406. A logical interface object can describe an interface to a virtual machine or virtual service attachment point. Examples of such attachment points include a bridge domain 408, a VLAN 410, a VPN 412, an MEF 414 and a PWE 416.

Figure 4B:
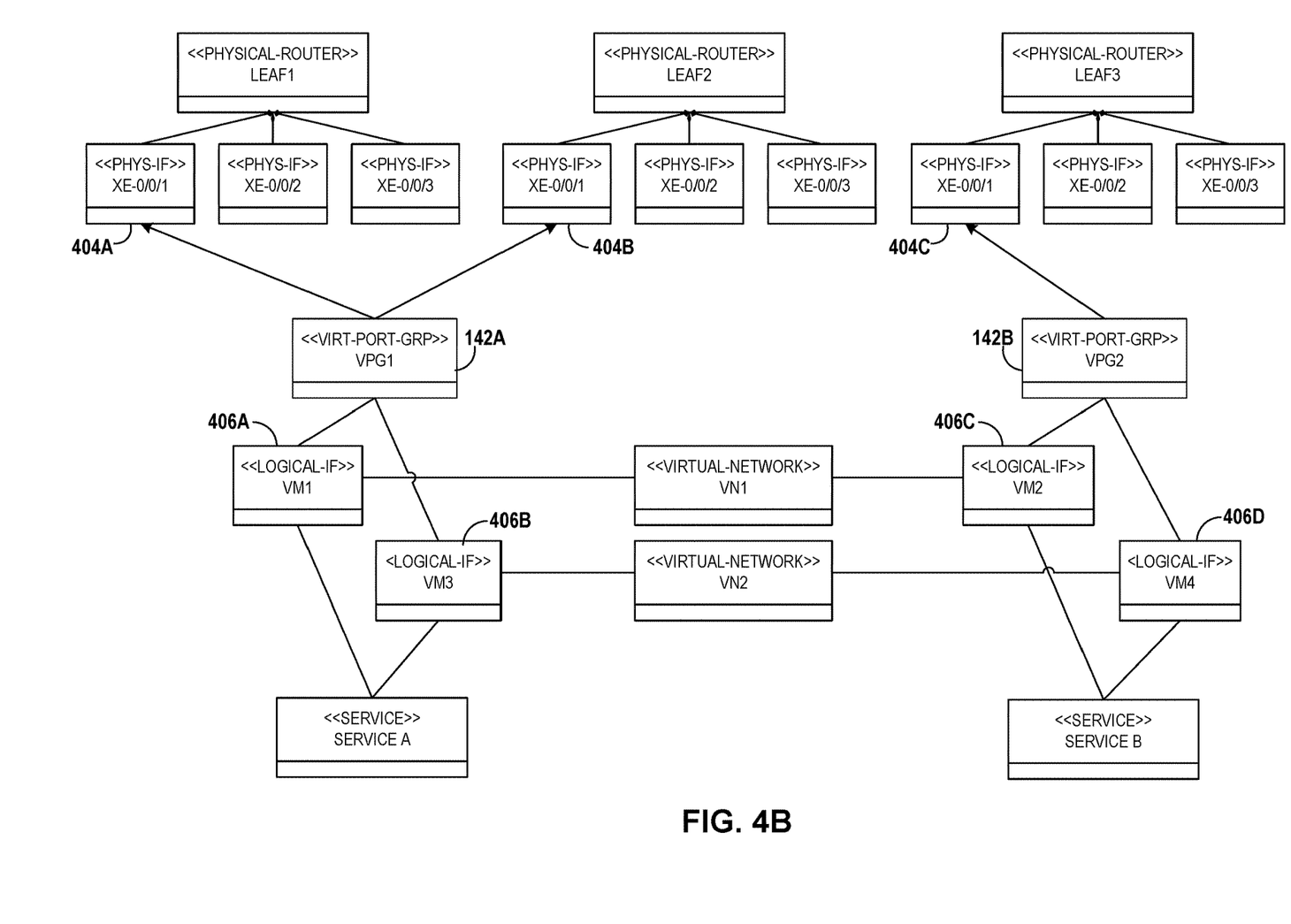
FIG. 4B is a block diagram illustrating an example data model for the example virtual port group configuration illustrated in FIG. 2.

FIG. 4B is a block diagram illustrating an example data model for the example virtual port group configuration illustrated in FIG. 2. In the example illustrated in FIG. 4B, virtual port group object 142A includes references to physical interface objects 404A and 404B that represent ports XE-0/0/1 on TOR switch "LEAF1" and XE-0/0/1 on TOR switch "LEAF2." Similarly, virtual port group object 142B includes a reference to physical interface object 404C that represents port XE-0/0/1 on TOR switch "LEAF3." Additionally, virtual port group object 142A includes references to virtual interface objects 406A and 406B, labeled "VM1" and "VM3" respectively. Virtual port group object 142B includes references to logical interface objects 406C and 406D labeled "VM2" and "VM4" respectively.

Figure 5:
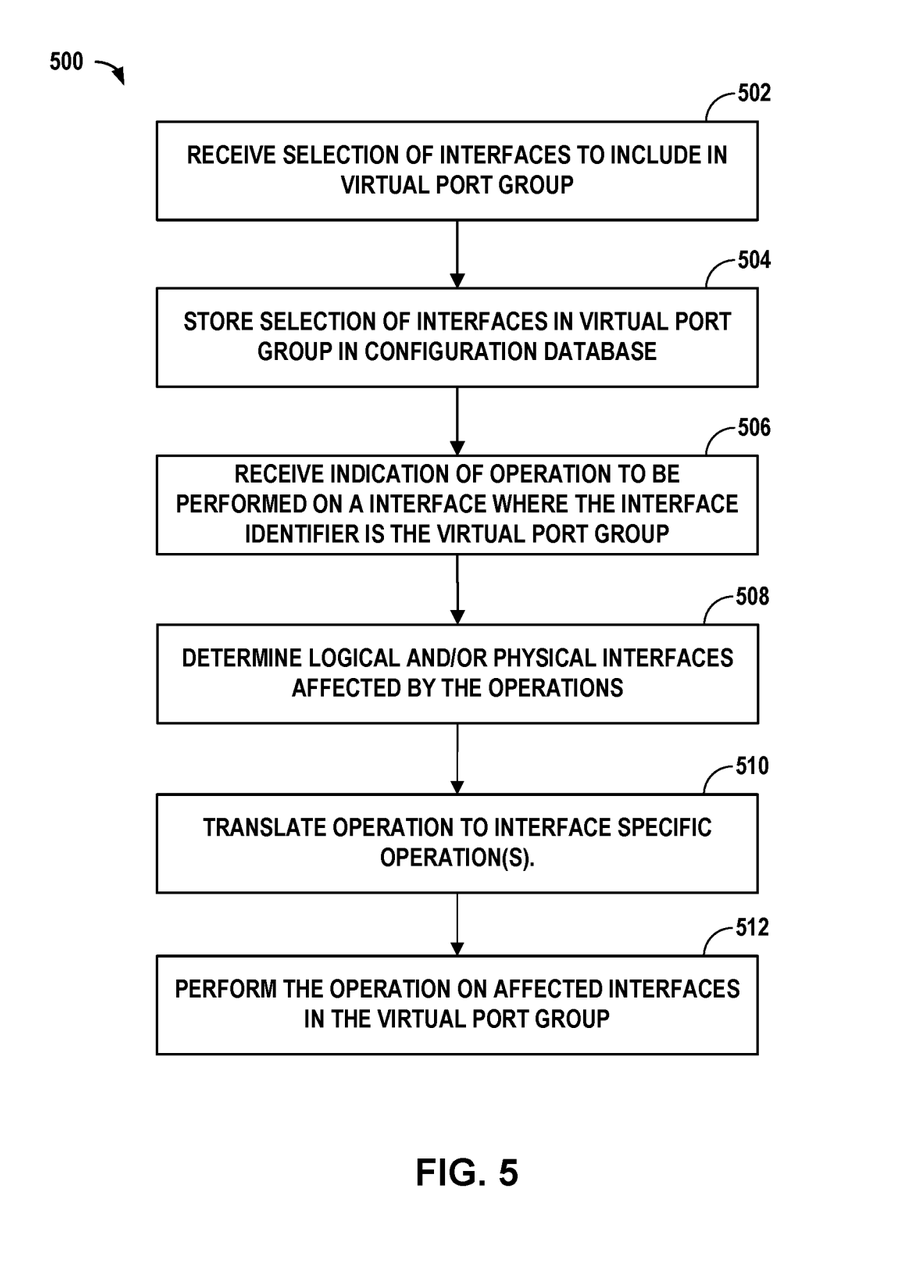
FIG. 5 is a flowchart illustrating operations of a method for creating and using a virtual port group in accordance with techniques described herein.

FIG. 5 is a flowchart illustrating operations of a method for creating and using a virtual port group in accordance with techniques described herein. Some or all of the operations may be carried out by a network management controller such as an SDN controller 132 (FIG. 1). In some aspects, the operations may begin by receiving a selection of one or more interfaces to include in the virtual port group (502). For example, a user may utilize a user interface device 129 (FIG. 1) to select physical and logical interfaces for inclusion in the virtual port group. The physical interfaces may include physical ports on routers and switches and other types of physical interfaces available in a data center. As discussed above, the logical interfaces may include virtual machine interfaces, virtual service interfaces, VLANs, VPNs, bridge domains, MEFs, PWEs and other logical interfaces available in a data center. The available interfaces may be presented to the user as a list of available interfaces for a switch, router, server, service etc. that have been configured for an SDN. The user interface device 129 may store the selected interfaces as a virtual port group object 142 (FIG. 1) in a configuration database 140 (FIG. 1) (504).

After the virtual port group has been configured, an indication of an interface action to be performed may be received (506). For example, a user interface device 129 may be used to supply configuration parameters with respect to the virtual port group (506). An orchestrator 130 (FIG. 1) or SDN controller 132 may provide an indication that an interface action is to be performed with respect to the virtual port group. In addition to configuration related interface actions, the interface actions may comprise modeling or deployment related actions.

The user interface may include fields that are designed to receive interface identifiers such as port identifiers or logical interface identifiers. A virtual port group identifier may be used in such fields to indicate that the desired interface actions are to be performed with respect to all relevant interfaces, both physical and logical, that are included in the virtual port group.

In response to receiving the indication of the interface action, the SDN controller 132 determines the logical and/or physical interfaces referenced by the virtual port group object identified by the virtual port group identifier that are affected by the interface action (508). An interface may be an "affected" interface if the interface action (or a translation of the interface action) is allowed or supported by the interface and/or can be successfully applied to the interface. For example, certain interface actions may only be relevant for VPNs. In this case, the "affected" interfaces would be interfaces to the VPNs of the identified virtual port group. In this example, the SDN controller 132 may cause the interface action to be carried out on the logical interfaces referenced by the virtual port group, but may ignore the physical interfaces. In another example, the interface actions may affect interfaces of a virtual port group that are part of a VPN, but are not part of a VLAN. In this example, the SDN controller 132 may cause the interface action to be carried out on the logical interfaces that are part of the VPN and the physical interfaces that are associated with the VPN logical interfaces, and ignore the logical and physical interfaces of the virtual port group that are not part of the VPN. In a further example, an interface action may only apply to physical interfaces. Thus, the SDN controller 132 may only apply the interface action to the relevant physical interfaces of the virtual port group while ignoring the logical interfaces.

Optionally, the SDN controller 132 may map, translate, translate, or otherwise convert the interface action to interface-specific interface actions (510). The interface actions may be interface-specific because of the type of interface, and in the case of physical interfaces, the model, manufacturer or version of the interface. In some aspects, the interface action may be converted to one or more commands that are issued to the affected interfaces. In some aspects, the interface action may include setting configuration parameters for the affected interfaces. In some aspects, converting an interface action to interface-specific interface actions may include converting interface action parameters to interface-specific parameters.

In some aspects, the virtual port group support functions 142 (FIG. 1) may include functions, methods, subroutines etc. that implement some or all the functionality described above. The virtual port group support functions 142 may determine which interfaces (logical and/or physical) of a virtual port group are to be the subject of the desired interface action or interface actions.

In some aspects, the virtual port group support functions 142 may perform the above-described mappings, translations and/or conversions. For example, a configuration action may be relevant to both physical and logical interfaces of a virtual port group. Thus, the virtual port group support functions 142 may map the interface action one way for the logical interfaces of the virtual port group, and a different way for the physical interfaces of the virtual port group.

Also, the virtual port group support functions 142 may map parameters for interface actions based on whether the interface action is for a physical port of the virtual port group or a logical port. For example, the virtual port group support functions 142 may map a virtual port group name to a virtual network identifier (VNI) in the case that the virtual port group includes an interface to an ethernet virtual private network (EVPN). Similarly, the virtual port group support functions 142 may map a virtual port group to an ethernet segment identifier (ESI) in the case that the virtual port group includes a VPN.

Further, the virtual port group support functions 142 may map the interface action to one or more interface actions that conform to interface actions particular to type, mode, version, or manufacturer of a device having a physical port in the virtual port group. For example, commands, labels and parameters used by a brand "A" switch may be different from commands, labels, and parameters used by a brand "B" switch. The virtual port group support functions 142 may map or translate interface actions for a physical interface of a virtual port group to use the appropriate commands, labels, and parameters for the manufacturer of the switch having the relevant physical interface.

The SDN controller 132 can the cause the interface action to be performed on the affected interfaces (512). Various entities may be involved in performing the indicated interface action. For example, a user interface device 129 may be used to perform configuration actions that use the virtual port group as an abstraction for the physical and/or logical interfaces included in the virtual port group. As an example, an identifier (e.g., "VPG1" and "VPG2" in the examples above) for a virtual port group may be specified where a port identifier is expected. When the user specifies configuration parameters for a port that has a virtual port group as an identifier, the configuration parameters (or values derived from the configuration parameters) may be applied to all the physical and/or logical interfaces of the virtual port group as appropriate during a configuration action. As a further example, a user may perform modeling actions for an SDN. The identifiers for the virtual port group may be used during modeling actions as an abstraction for the physical and logical interfaces of the identified virtual port group. As a still further example, an orchestrator 130 or SDN controller 132 may perform configuration actions for a switch, router or service using the interface definitions and configuration parameters associated with a virtual port group.

Figure 6A:
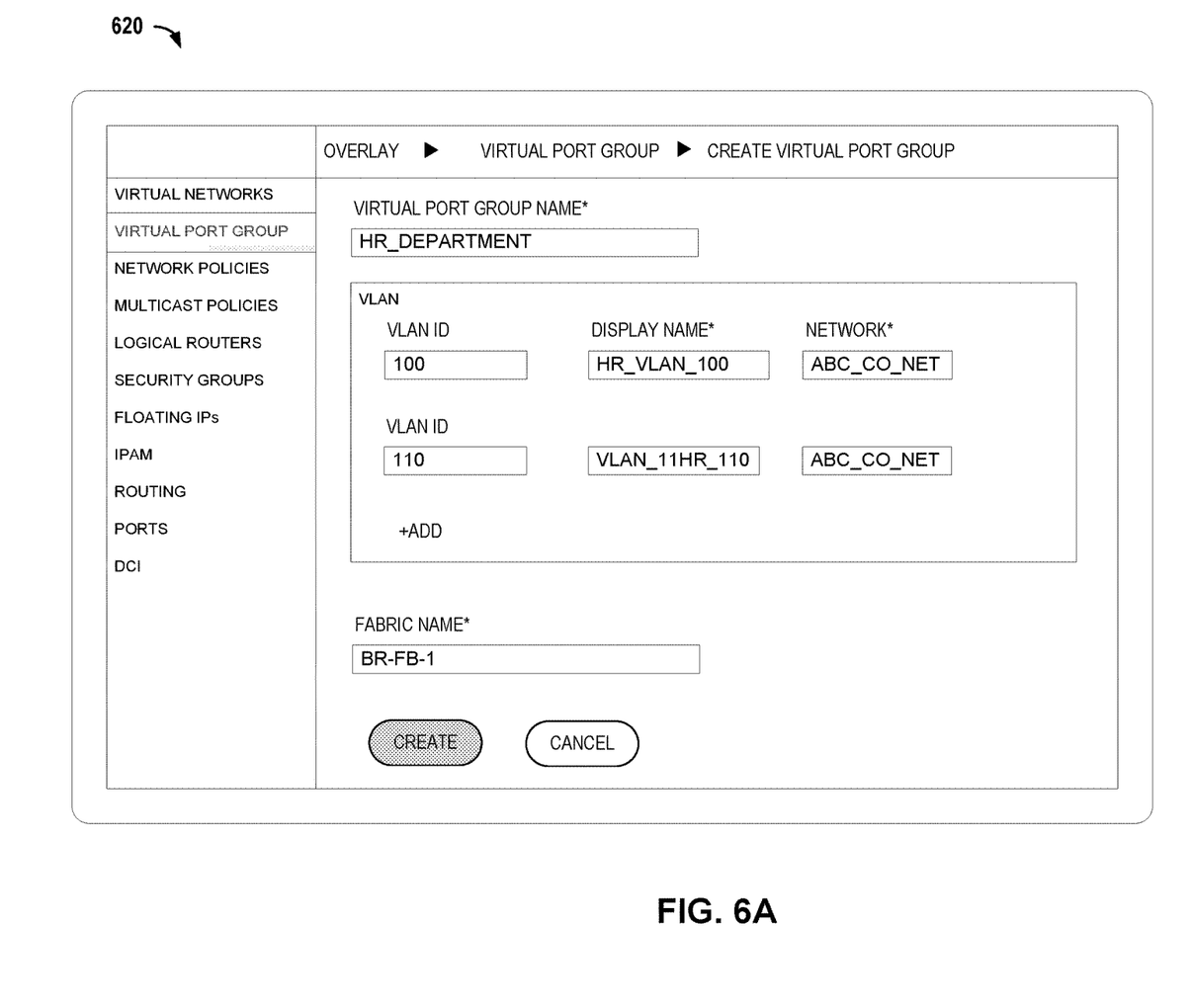
FIGS. 6A-6B are example user interface screens for configuring a virtual port group in accordance with techniques described herein.
Figure 6B:
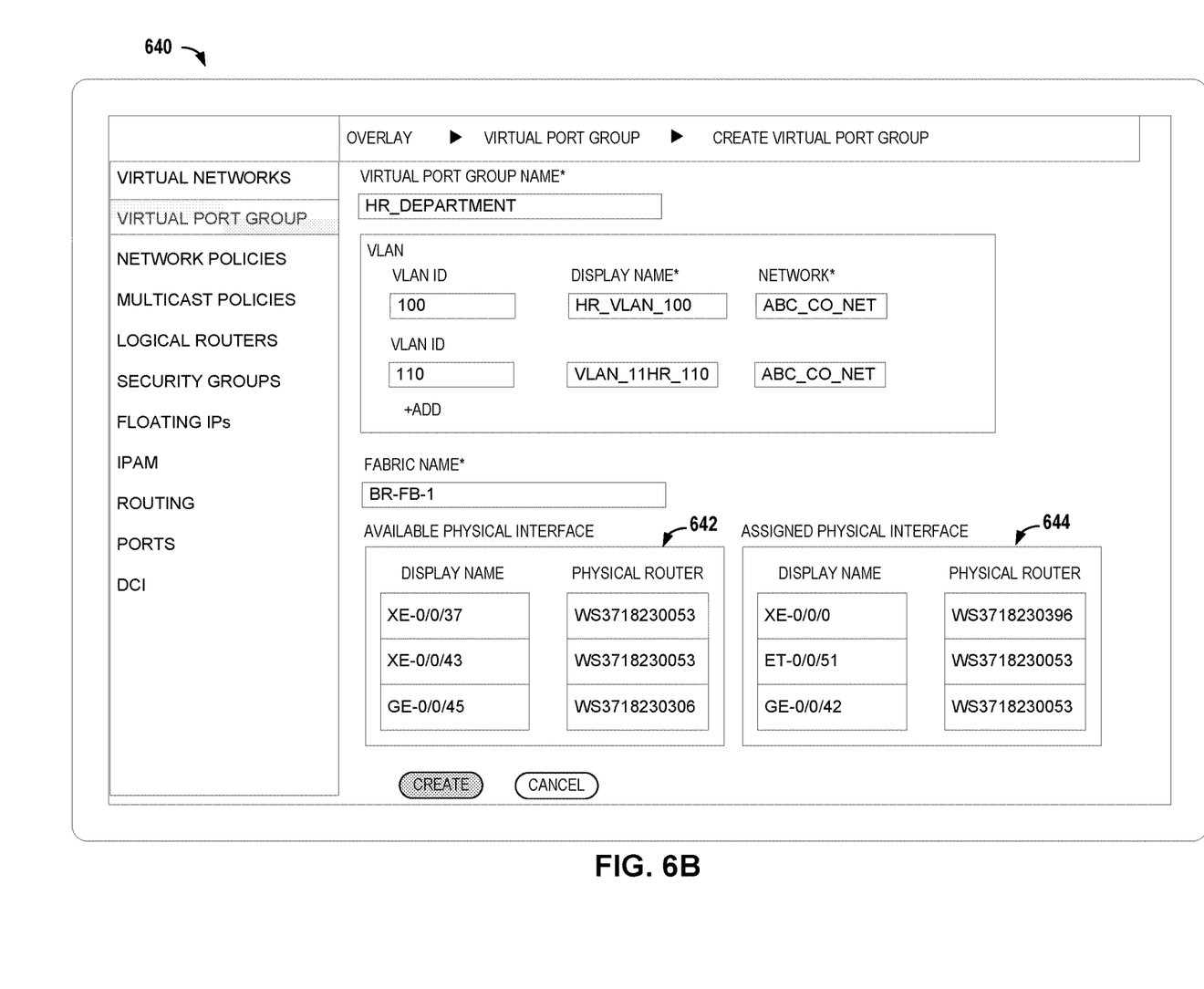

FIGS. 6A and 6B are example user interface screens for configuring a virtual port group in accordance with techniques described herein. FIG. 6A illustrates an example user interface screen 620 for creating a virtual port group. Various input fields of the example user interface screen 620 facilitate defining a virtual port group name identifying the virtual port group, VLANs or other logical interfaces assigned to the virtual port group, and a fabric identifier associated with the virtual port group.

FIG. 6B illustrates an example user interface screen 640 that facilitates specifying the physical interfaces that are to be associated with the virtual port group. In the example user interface screen 640, a first region 642 provides a list of available physical interfaces. A user can select a physical interface from the list provided in first region 642. Upon selection, the selected physical interface can be associated with the virtual port group and listed as an assigned physical port in a second region 644.

The detailed description above has been presented in the context of a data center having physical, logical, and virtual infrastructure, some of which may be controlled by software defined networking techniques. However, the techniques described herein are applicable as well to any group of servers and network devices having both physical and virtual resources.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various interface actions and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
storing, in a configuration database by a Software-Defined Networking (SDN) controller, a virtual port group object for a virtual port group, the virtual port group identified by a virtual port group name of the virtual port group object, the virtual port group object comprising one or more references to interface objects representing logical interfaces and physical interfaces in a network controlled in part by the SDN controller;
receiving, by the SDN controller for the network, an indication of an interface action and an interface identifier that identifies the virtual port group by the virtual port group name, the interface action to be performed on the virtual port group;
determining, by at least one virtual port group support function of the SDN controller, a plurality of logical and physical interfaces affected by the interface action, the plurality of logical and physical interfaces having interface objects referenced by the virtual port group object for the virtual port group;
converting, by the at least one virtual port group support function of the SDN controller, the interface action to a corresponding one or more interface-specific interface actions for each interface of the plurality of logical and physical interfaces that are affected by the interface action; and
applying the corresponding one or more interface-specific interface actions to each interface of the plurality of logical and physical interfaces that are affected by the interface action.

2. The method of claim 1, wherein the interface action comprises a configuration action, and wherein converting the interface action comprises determining one or more configuration parameters for each interface of the plurality of logical and physical interfaces that are affected by the interface action.

3. The method of claim 1, wherein the plurality of logical and physical interfaces that are affected by the interface action comprises a logical interface of the virtual port group that is associated with a multi-homed server having a plurality of physical interfaces,
wherein converting the interface action to the corresponding one or more interface-specific interface actions comprises converting the interface action to corresponding interface-specific interface actions for the logical interface and converting the interface action to corresponding interface-specific interface actions for each of the plurality of physical interfaces of the multi-homed server.

4. The method of claim 1, wherein the plurality of logical and physical interfaces that are affected by the interface action comprise one or more physical interfaces of a switch or router.

5. The method of claim 1, wherein the plurality of logical and physical interfaces that are affected by the interface action comprise one or more logical interfaces for a service configured on the network.

6. The method of claim 5, wherein the service configured on the network is one of a Virtual Private Network (VPN), Virtual Area Network (VLAN), a Managed Extensibility Framework (MEF), and a Pseudo Wire Emulation (PWE).

7. The method of claim 1, wherein the plurality of logical and physical interfaces that are affected by the interface action comprise:
   at least one logical interface; and
   at least one physical interface.

8. A Software Defined Networking (SDN) controller comprising:
   one or more processors coupled to a memory, the memory including executable instructions to cause the one or more processors to:
   store, in a configuration database, a virtual port group object for a virtual port group, the virtual port group identified by a virtual port group name of the virtual port group object, the virtual port group object comprising one or more references to interface objects representing logical interfaces and physical interfaces in a network controlled in part by the SDN controller;
   receive an indication of an interface action and an interface identifier that identifies the virtual port group by the virtual port group name, the interface action to be performed on the virtual port group;
   determine, by at least one virtual port group support function, a plurality of logical and physical interfaces affected by the interface action, the plurality of logical and physical interfaces having interface objects referenced by the virtual port group object for the virtual port group;
   convert, by the at least one virtual port group support function, the interface action to a corresponding one or more interface-specific interface actions for each interface of the plurality of logical and physical interfaces that are affected by the interface action; and
   apply the corresponding one or more interface-specific interface actions to interface of the plurality of logical and physical interfaces that are affected by the interface action.

9. The SDN controller of claim 8, wherein the interface action comprises a configuration action, and wherein the executable instructions include instructions to determine one or more configuration parameters for each interface of the plurality of logical and physical interfaces that are affected by the interface action.

10. The SDN controller of claim 8, wherein the plurality of logical and physical interfaces that are affected by the interface action comprises a logical interface of the virtual port group that is associated with a multi-homed server having a plurality of physical interfaces, and wherein the executable instructions to convert the interface action comprise instructions to cause the one or more processors to convert the interface action to corresponding interface-specific interface actions for the logical interface and convert the interface action to corresponding interface-specific interface actions for each of the plurality of physical interfaces of the multi-homed server.

11. The SDN controller of claim 8, wherein the plurality of logical and physical interfaces that are affected by the interface action comprise one or more physical interfaces of a switch or router.

12. The SDN controller of claim 8, wherein the plurality of logical and physical interfaces that are affected by the interface action comprise one or more logical interfaces for a service configured on the network.

13. The SDN controller of claim 12, wherein the service configured on the network is one of a Virtual Private Network (VPN), Virtual Area Network (VLAN), a Managed Extensibility Framework (MEF), and a Pseudo Wire Emulation (PWE).

14. The SDN controller of claim 8, wherein the plurality of logical and physical interfaces that are affected by the interface action comprise:
   at least one logical interface; and
   at least one physical interface.

15. The SDN controller of claim 8, wherein the SDN controller is configured in a data center.

16. Non-transitory computer-readable media comprising instructions for causing one or more programmable processors to:
   store, in a configuration database, a virtual port group object for a virtual port group, the virtual port group identified by a virtual port group name of the virtual port group object, the virtual port group object comprising one or more references to interface objects representing logical interfaces and physical interfaces in a network controlled in part by a Software-Defined Networking (SDN) controller;
   receive an indication of an interface action and an interface identifier that identifies the virtual port group by the virtual port group name, the interface action to be performed on the virtual port group;
   determine, by at least one virtual port group support function of the SDN controller, a plurality of logical and physical interfaces affected by the interface action, the plurality of logical and physical interfaces having interface objected referenced by the virtual port group object for the virtual port group;
   convert, by the at least one virtual port group support function of the SDN controller, the interface action to a corresponding one or more interface-specific interface actions for each interface of the plurality of logical and physical interfaces that are affected by the interface action; and
   apply the corresponding one or more interface-specific interface actions to each interface of the plurality of logical and physical interfaces that are affected by the interface action.

17. The non-transitory computer-readable medium of claim 16, wherein the interface action comprises a configuration action, and wherein the instructions to convert the interface action include instructions to determine one or more configuration parameters for each interface of the plurality of logical and physical interfaces that are affected by the interface action.

18. The method of claim 1, wherein the interface action comprises either modeling related actions or deployment related actions.

19. The SDN controller of claim 8, wherein the at least one virtual port group support function determines the plurality of logical and physical interfaces affected by the interface action by determining which of the logical interfaces and physical interfaces referenced by the virtual port group object support the interface action.

20. The non-transitory computer-readable medium of claim 16, wherein the at least one virtual port group support function converts the interface action to the corresponding one or more interface-specific interface actions based on a mapping of the interface action to the corresponding one or more interface-specific interface actions that conform to a corresponding interface of the plurality of logical and physical interfaces that are affected by the interface action.

* * * * *